US007024757B2

(12) United States Patent
Clarke et al.

(10) Patent No.: US 7,024,757 B2
(45) Date of Patent: Apr. 11, 2006

(54) DEVICE AND METHOD FOR POSITIONING FLEXIBLE TUBES INTO A CORE AND ARTICLES MADE THEREFROM

(75) Inventors: Gordon James Clarke, Markham (CA); Michael Nicola Rozyle, Brampton (CA)

(73) Assignee: Cesaroni Technology Incorporated, Gormley (CA)

( * ) Notice: Subject to any disclaimer, the term of this patent is extended or adjusted under 35 U.S.C. 154(b) by 15 days.

(21) Appl. No.: 10/421,108

(22) Filed: Apr. 23, 2003

(65) Prior Publication Data

US 2004/0049916 A1    Mar. 18, 2004

Related U.S. Application Data

(60) Provisional application No. 60/376,621, filed on Apr. 30, 2002.

(51) Int. Cl.
    *B21D 53/02*    (2006.01)
(52) U.S. Cl. .................. 29/726.5; 29/726; 29/234; 29/33 T; 29/890.03; 165/78; 414/745.3
(58) Field of Classification Search .............. 29/726, 29/726.5, 234, 890.03, 890.036, 890.04, 29/890.043, 33 T; 165/172, 78, 173–176; 414/475.3, 745.3
    See application file for complete search history.

(56) References Cited

U.S. PATENT DOCUMENTS 2,778,174 A * 1/1957 Malone ................. 53/473
3,277,959 A * 10/1966 Withers ................ 165/159
3,406,838 A * 10/1968 Davidson .............. 414/746.1
3,697,635 A   10/1972 Dietzsch
3,789,479 A * 2/1974 Zifferer et al. ............ 29/726
4,030,540 A * 6/1977 Roma .................... 165/172
4,734,965 A   4/1988 Schaefer
5,687,473 A   11/1997 Tokura
6,581,273 B1 * 6/2003 Rhodes ................. 29/726.5

FOREIGN PATENT DOCUMENTS

DE    29 37 689       6/1980
GB    2 091 125 A     7/1982

OTHER PUBLICATIONS

Patent Abstracts of Japan, Publication No. 63076729, Manufacture of Cross Fin Type Heat Exchanger, Ogasawara Noboru.
Patent Abstracts of japan, Publication NO. 59050933, Method and Device for Inserting Tube, Yamatani Yuni.

* cited by examiner

*Primary Examiner*—Eric Compton
(74) *Attorney, Agent, or Firm*—Arent Fox PLLC

(57) ABSTRACT

This invention relates to fabrication of tube bank style heat exchangers and similar assemblies. It provides a novel device and a method for presenting and feeding multiple relatively flexible tubes in a predetermined spaced apart manner, and subsequently threading them through corresponding holes in tube-sheets, baffles or similar components during fabrication of the core structure, for example a heat exchanger core.

7 Claims, 4 Drawing Sheets

DEVICE AND METHOD FOR POSITIONING FLEXIBLE TUBES INTO A CORE AND ARTICLES MADE THEREFROM

CROSS REFERENCE TO RELATED APPLICATIONS

This application claims the benefit of U.S. Provisional Application No. 60/376,621, filed Apr. 30, 2002

FIELD OF THE INVENTION

This invention relates to devices used to align tubes within manufactured structures. More particularly this invention relates to such devices used to present flexible tubes for insertion within structures such as heat exchanger cores and in which the tubes must be precisely positioned relative to each other.

BACKGROUND OF THE INVENTION

A variety of manufactured components contain tubing arranged in configurations suitable for their particular uses. For example, tubes are arranged and secured within harnesses or otherwise clamped together in desired arrangements for the transport of fluid (including both liquids and gases). Several illustrations of such configurations are found in vehicles, where power steering fluids and coolants and the like are delivered through tubing and hoses that must be precisely located and secured within the engine compartment. In these cases, the installation of the tubing is relatively straightforward and not particularly time-consuming.

However there are a multitude of more complex applications in which the article of manufacture contains a large number of tubes each of which must be precisely located relative to the other. One such example is in a tube bank-style heat exchanger, in which individual tubes need to be presented to tube sheets, baffles and other components and precisely fed through corresponding holes in them. Conventional approaches to the manufacture of such devices, and particularly those incorporating polymeric tubes that due to their flexibility pose significant challenges in precisely aligning them to holes and channels through which they must pass, include manual assembly. It will be readily appreciated that this is very laborious and time consuming. And while automated techniques have been developed to handle, position and feed rigid tubes (such as metal tubes) into appropriate receptacles, these approaches are generally not suitable for the manipulation of flexible tubes in assemblies because their orientation is less predictable.

Compounding the problem, and again in tube bank-style heat exchangers using polymeric tubing, there are precise tolerances involved in positioning large numbers of small, flexible tubes within both a specific configuration and a compact design envelope. For example and depending on the application selected, tubes only 2 mm in diameter (or less) but having lengths of 2–3 feet (or more) might be arranged in a series of rows such that they are a mere 1–2 mm apart. In order to automate the process of feeding multiple tubes into a fixed receptacle, it is necessary not only to align the tubes (for example in a column) but also ultimately to position them in a pre-determined and spaced-apart manner.

It is therefore an object of the present invention to provide a device suitable for the incorporation of a plurality of flexible tubes into a core assembly, and in which the tubes are aligned sufficient for insertion within the assembly in a desired configuration. Another object of the invention is to provide for such a device in conjunction with supporting apparatus to ensure that the tubes are pushed into the core assembly in a controlled manner and properly guided into position within the core assembly. A feature of the present invention is that it can accommodate a number of tube structure designs. Another feature is that the device can be made from a wide variety of materials, so long as the material selected is sufficiently rigid to guide the polymeric tubing along its surface without causing damage thereto. The invention offers several advantages, among them an automated process for the installation of flexible tubing into a core assembly such as a heat exchanger. These and other objects, features and advantages will become apparent upon having reference to the detailed description of the invention herein.

SUMMARY OF THE INVENTION

There is provided and claimed herein a device for positioning flexible tubes at predetermined locations. This device comprises a surface comprising a channel formed therein. This channel is sufficient to accommodate a plurality of tubes arranged substantially proximally to one another along their lengths thereof. The channel also comprises a plurality of tapered surfaces interspersed within the channel to direct the tubes into passages therealong. The passages define a predetermined pitch of the tubes relative to each other. The surface is formed sufficient to contain the tubes within the device. Optionally a second surface is placed in contact with this surface so that together the surfaces are sufficient to contain the tubes.

Further, the positioning device can be incorporated into an apparatus for the manufacture of core assemblies, like heat exchangers. In one configuration of such apparatus, a moveable ram urges the tubes contained in a receptacle (such as a cartridge) into the channel of the positioning device. Conduits are inserted into the passages of the positioning device, and guide the movement of the tubes therethrough. The conduits in turn are aligned with the core assembly so that the tubes are received and installed within this assembly. A guide mandrel is also used in conjunction with the device. It functions to draw the tubes into the core assembly without having them bend under their own weight, so that the tubes draw through various supporting structures.

The invention will become better understood through a review of the following drawings that provide illustrations of various embodiments thereof.

DETAILED DESCRIPTION OF THE INVENTION

Figure 1:
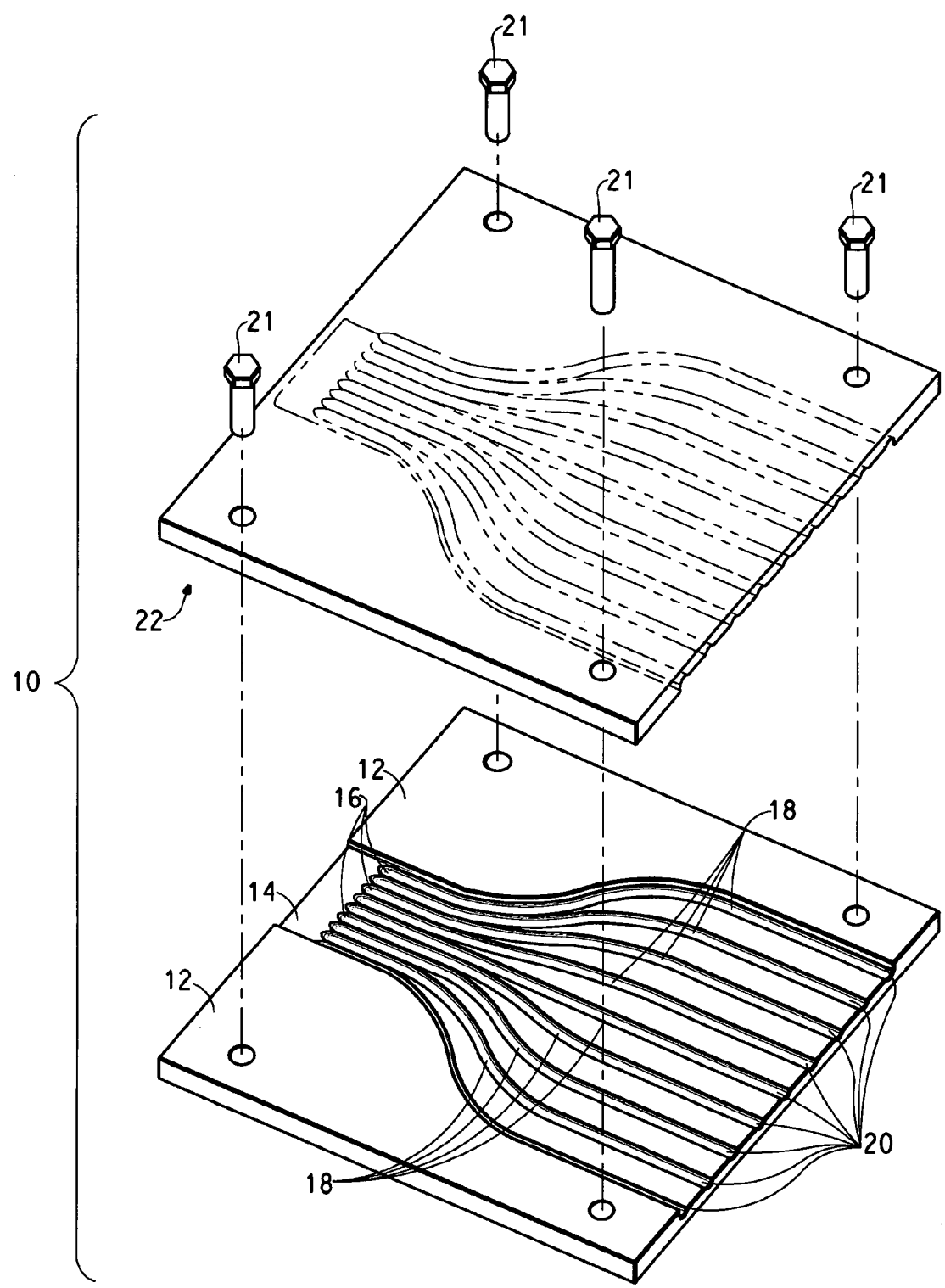
FIG. 1 is an exploded view of the positioning means of the present invention and adapted to receive and to position the tubing as it moves therealong.

Having reference to FIG. 1, the positioning device is shown generally at 10. It is seen that this device has a surface 12 and the various attributes of the device are machined onto this surface. Tubes are collected and gathered for presentation to the channel 14 formed on surface 12. The tubes may be fashioned into any of a number of shapes in cross section as may be desired for a particular assembly, and it is even possible to present tubes of more than one shaping to the channel 14 at the same time. The tubes have a line of symmetry in cross section (for example as can be drawn in oval or circular or rectangular shapes), so that once identically shaped tubes are presented to the channel 14 they are identically aligned to said channel 14. One popular shaping is the round tube.

The channel 14 is of sufficient width to accommodate a collection of tubes arranged adjacent to one another and contacting the channel 14. Thereafter and as the tubes are urged along the channel 14 (and substantially perpendicular to edge 15 thereof) they encounter a series of tapered surfaces 16. These tapered surfaces 16 formed along the surface 12 are designed to gradually position the tubes into separate and defined passages 18. They may be aligned linearly or staggered or in general located in any other configuration intended to direct the tubes toward the passages 18.

The passages 18 (just beyond the tapered surfaces 16) are of a suitable depth and width to accommodate the tubes and direct them along their designed pathway. For example, and without intending to limit the generality of the foregoing, the passages 18 illustrated in FIG. 1 are generally curved (except for the center passage 18 which is straight) and with the result that the tubes upon exiting the passages 18 of the positioning device 10 are spaced a predetermined distance apart from each other (known as "pitch"). It is readily appreciated that by varying the location of the tapered surfaces 16 and the passages 18 different technical effects can be achieved. For example, the designer might engineer the same or a different pitch between the tubes.

The passages 18 also may contain etched portions 20 that are designed to receive conduits (not shown). The specifications and function of the conduits are described together with FIG. 2 further below.

Figure 3:
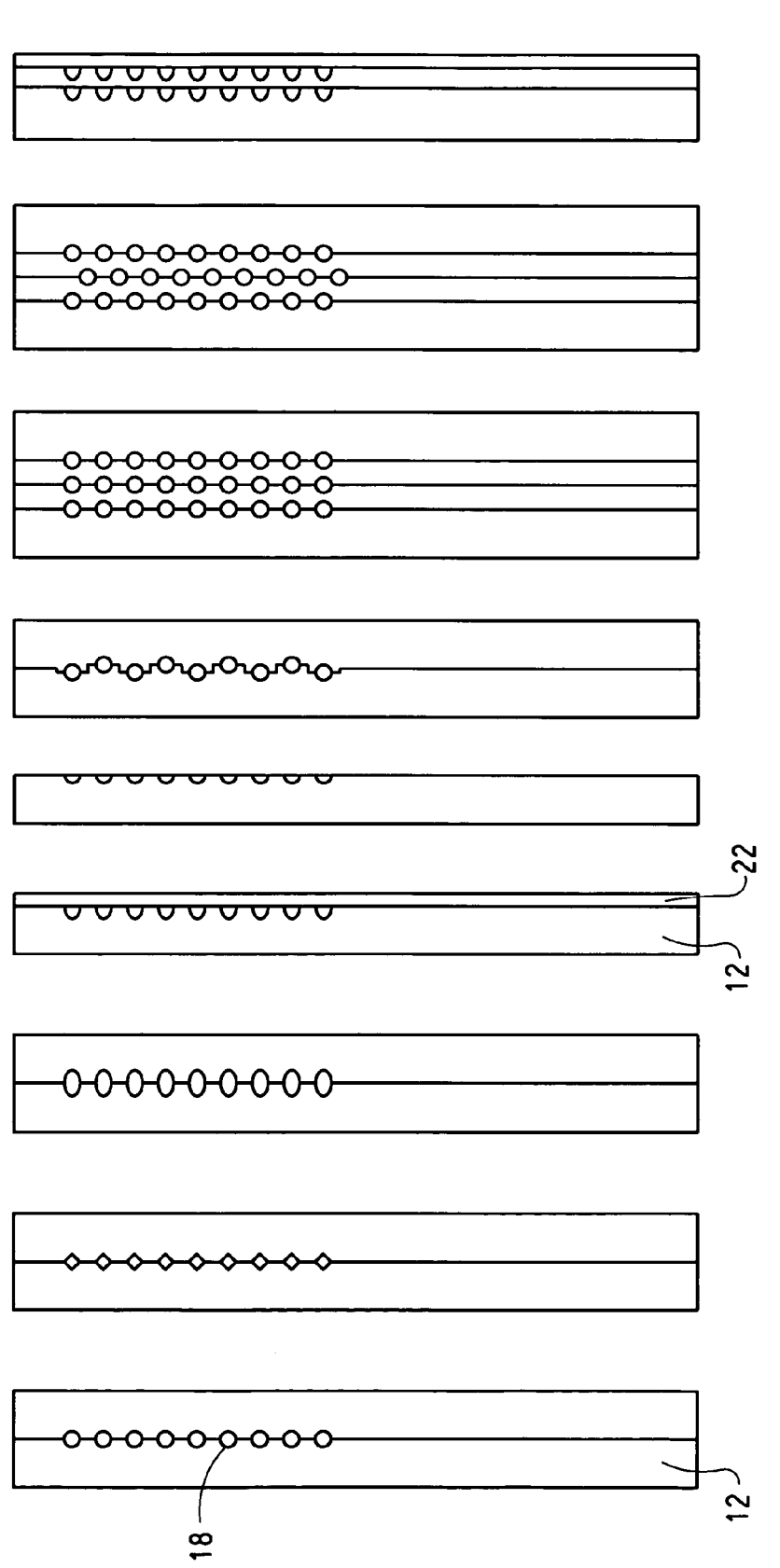
FIG. 3 is a side view of several embodiments of the positioning means of the present invention including configurations for passages.

The passages 18 of the surface 12 may be machined to a size and geometry sufficient to contain the tubes therein. These passages 18 may be any of a number of shapings in cross section, several of which are illustrated in FIG. 3 (circular, diamond, and oval shaped). Moreover these passages 18 do not necessarily need to be shaped identically to the shape of the tube. For example, a passage 18 that is oval in cross section may nevertheless accommodate and direct a circular tube. A second surface 22 may contact the surface 12, and functions to further secure the tubes within the channels and passages of the surface 12. This second surface 22 is important for designs in which the surface 12 accommodates but does not securely contain the tubes (for example, if the passages 18 in the surface 12 are exposed at the surface 12 in a way that the tubes are not secured within them). In one embodiment, the second surface 22 is an exact duplicate of the surface 12 (and with each passage 18 alone shaped as a semi-circle), so that when the surfaces are joined the combined passages 18 are circular to allow a controlled movement of the tubes. Other embodiments are also contemplated, for example it is possible for the second surface 22 to be planar so long as the first surface 12 has a channel 14 and passages 18 formed therein of sufficient depth to allow for movement of the tubes.

The positioning device 10 is held together by any of a variety of conventional means, including clamping or a pressed assembly or (as shown in FIG. 1) bolting of surfaces into place using bolts 21 which attach within another surface (such as the second surface 22).

Figure 2:
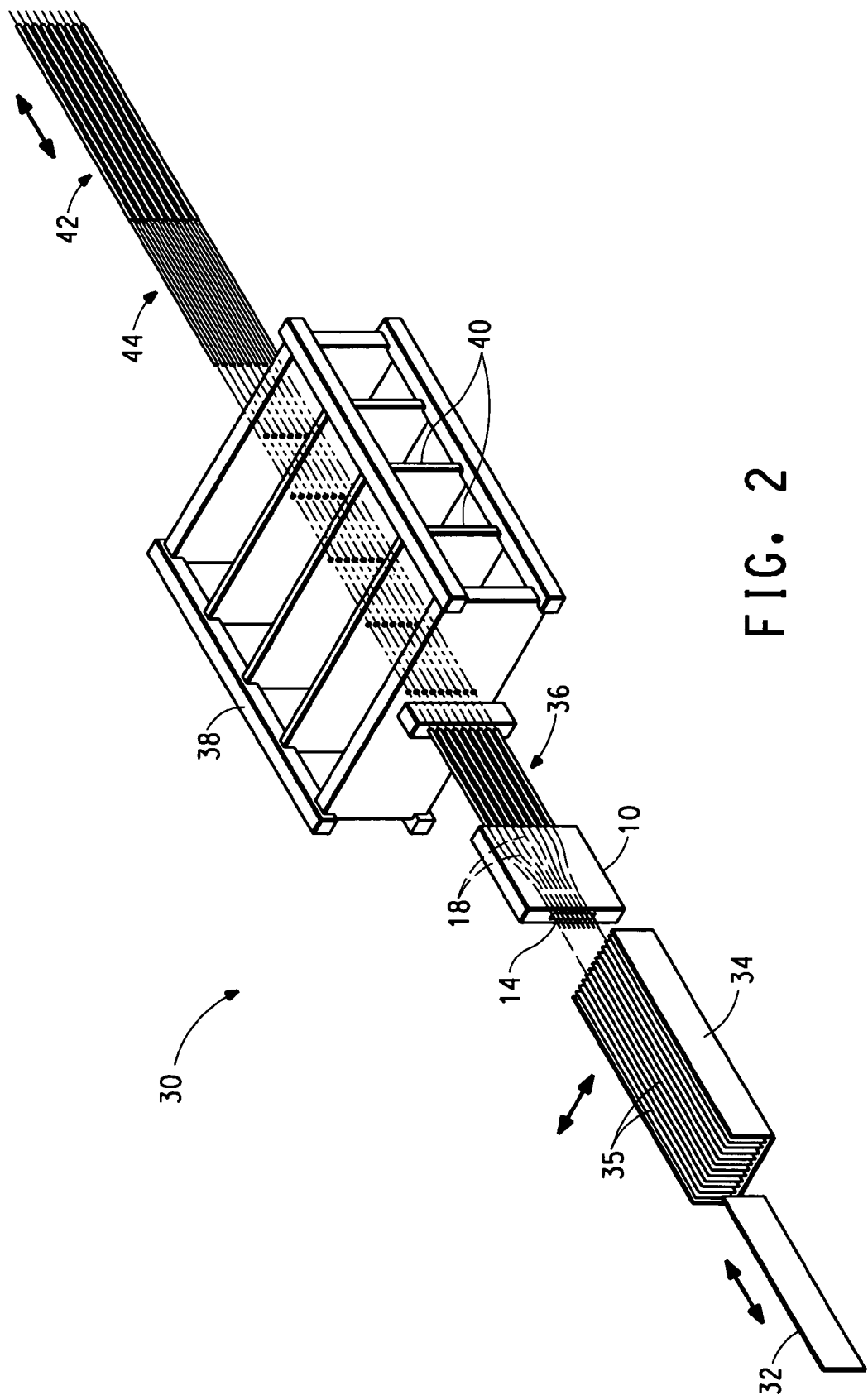
FIG. 2 is a perspective view of an assembly of the present invention and including the positioning means in operation with additional apparatus to provide an automated process for the feeding of flexible tubing into a core structure.

Having reference to FIG. 2, the positioning device 10 is shown as part of a larger apparatus generally designated at 30. A ram 32 is applied to a stack of tubes. Generally the stack of tubes may be assembled in any suitable receptacle (as shown, they are stacked into columns 35 of cartridge 34). The force of the ram 32 urges the tubes through the positioning device 10 (at channel 14). The passages 18 of the positioning device 10 receive the conduits 36. The ends of the passages 18 are oversized relative to other portions thereof, and the conduits 36 penetrate these passages 18 in the oversized area. In this manner the tubes traversing the passages 18 are not impeded as they pass through the region where the passages 18 join the conduits 36.

It is further seen that the tubes pass through the conduits 36 and to be received within the core assembly 38 (which might be a heat exchanger). Core assemblies 38 typically require that the tubes thread through one or more supporting structures 40 (as shown, plates). Because the polymeric tube is flexible and bends under its own weight, misalignment of the tubes through the supporting structures 40 is a consideration. To overcome this, guide mandrel 42 containing guide rods 44 is positioned to support the individual tubes as they move through the supporting structures 40. The guide rods 44 are positioned to pass through the supporting structures 40 and mate with the end of each tube in the vicinity of the conduit 36. These guide rods 44 typically have a sharpened or pointed end to facilitate their placement within the tubes. Once inserted, it is not necessary for the guide rods 44 to actually be secured to the tubes. Instead the guide rods 44 are merely intended to counteract the effects of tube bending so that the tubes pass freely along the core assembly 38 and through the supporting structures 40.

The coordination of the operation of the various components described above is central to the automated manufacture of core assemblies. Directional movement of these components is illustrated with arrows in FIG. 2. The cartridge 34 is supplied with tubes of a specified length in one or more of the columns 35. The cartridge 34 is moveable (typically powered by a motor) to present tubes between the ram 32 and the positioning device 10. A controlled movement of the core assembly 38 is accomplished through any of a number of techniques known to those of skill in the art, such as an actuator assembly. As tubes exiting from the conduit 36 are inserted into position in a core assembly 38, the actuator then repositions the core assembly to receive another set of tubes therethrough. It will be appreciated that the actuator can position the core assembly 38 in any position in a plane (for example, up-down and left-right) as may be required to locate the tubes at positions in the core assembly 38 as selected by the designer.

Typically and in operation each of the cartridge 34, positioning device 10 and conduits 36 contain tubes. As the ram 32 urges tubes from the cartridge 34 into the positioning device 10, this action in turn displaces the tubes contained in the positioning device 10 into the conduits 36. This motion then pushes the tubes previously contained in the conduits 36 into the core assembly 38 (and in alignment along the supporting structures 40 with the assistance of the guide rods 44). The guide mandrel 42 is withdrawn to allow for this overall advance of the tubes through the system.

Once this cycle is completed, the ram 32 is restored to its original position, and the cartridge 34 is moved to align the ram 32 with a column 35 containing additional tubes. The core assembly 38 is also repositioned to provide a location for the next set of tubes to be inserted. Once the core assembly 38 receives the requisite amount of tubes, it is withdrawn from the assembly and a new core assembly 38 is inserted in its place.

The assembly can be operated in conjunction with a feed hopper such that columns 35 of tubes in cartridge 34 are pushed by subsequent columns of tubes which are in turn are pushed by the ram 32. Feeding a new column 35 of tubes after every threading step (eg placement of a column of tubes into the core assembly 38) thus allows the device to be operated in a continuous manner.

The positioning device 10 may be constructed from any number of materials. Metals offer obvious benefits in rigidity for guiding the tubes along a precisely defined path. Aluminum is a preferred metal for this purpose. The surfaces of the channels 14 and passages 18 may be smooth or textured. One advantage of a specially designed textured surface can be to minimize the area of contact between the tube surface and the passage surface, thereby minimizing the friction and abrasive effects. Optionally lubricants may be used either to the channels and passages of the positioning device 10 or to the tubes themselves, to counter any abrasive effects in the transport of the tubes through the device. However care should be exercised in selecting and using any lubricants so as to not degrade or otherwise deleteriously affect the tubes and their function.

Having reference to FIG. 3, a variety of design possibilities for the positioning device 10 are contemplated herein. This figure offers side views of the ends of one or more surfaces 12 and second surfaces 22, and depicts the passages 18 formed therein. In one arrangement, the surface 12 and the second surface 22 are identical to one another and when brought together form the channels 14, tapered surfaces 16, and passages 18 of desired pitch. The illustrations depict in cross section the passages 18 as circles, diamonds and ovals, all formed by the joinder of the surface 12 and the second surface 22. It is also possible to use an array of multiple positioning devices 10 used in concert, in which case the array so formed might receive tubes from a plurality of columns 35 of cartridge 34 (or other receptacle) and in turn urged by a plurality of rams 32. In another embodiment, a first surface 12 may be formed on both sides of one positioning device 10. Other embodiments (as shown) can be crafted to suit a variety of design possibilities, including passages that are offset versus adjacent passages, passages formed using a planar second surface, passages formed on one surface that are sufficiently formed to contain tubes without requiring a second surface, and the like.

Figure 4:
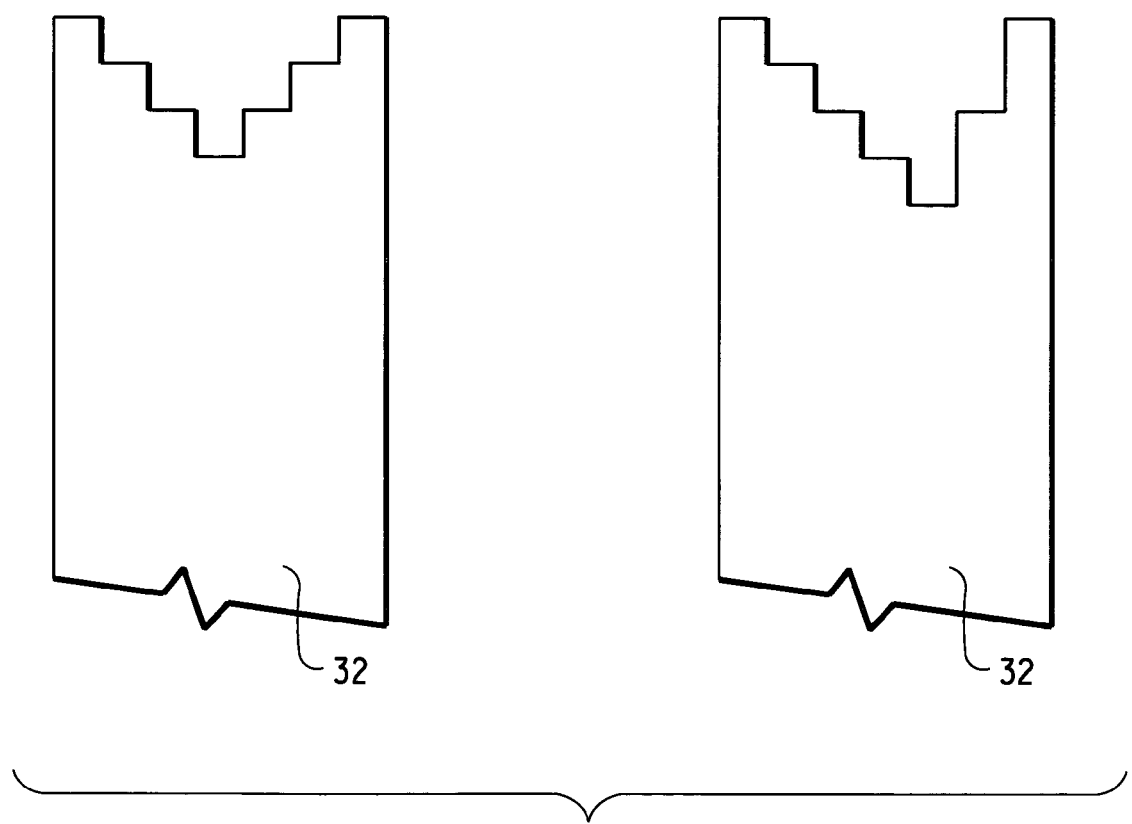
FIG. 4 is a side view of two embodiments of the ram of the present invention and including staggered surfaces that contact the tubes.

Having reference to FIG. 4 herein, two styles of rams 32 are shown. The tubes may be fed to the positioning device 10 in a planar manner (meaning all tube ends enter the channel 14 of positioning device 10 simultaneously). In such a scenario the ram 32 is shaped as a uniform, flat surface at the contact point with the tubes. The tubes advance along the apparatus and are placed in the core assembly 38. However because the tubes may not all travel the same distance (due to the configurations of the passages 18 along the positioning device 10) the ends of the tubes may become offset relative to one another once they travel through the passages 18.

If this is not a desired result, then the rams 32 may be styled to include staggered surfaces, as shown in FIG. 4. By incorporating such stepped or staggered rams 32 into the assembly, tubes of equal length can be inserted through the positioning device 10 and even though they may travel different distances nevertheless are not offset relative to one another after passing therethrough. It is readily appreciated that the selection of any number of designs of the ram 32 and the passages 18 may be conducted to accomplish a particular tube arrangement for an application of interest.

There are several advantages associated with the assemblies and process of the present invention. It allows for the handling and automated processing of relatively flexible tubes. It is very robust with coordinated moving parts including the ram 32, the cartridge 34, the core assembly 38, and the guide mandrel 42 (all under control of various motors and actuator assemblies). Changing the pitch or relative positioning of the tubes merely requires simple substitution of the machined positioning device 10. The device is thus easily adaptable in commercial production settings.

EXAMPLE

Polymeric tubes (in one embodiment monolayer tubes of polyamide 66; and in another embodiment multi-layer tubes consisting of polyamide 66/a tie layer/LCP) represent different degrees of flexibility. The tubes of each embodiment were 2.7 mm diameter and 0.2 mm wall thickness. A plastic tube sheet with 2.74 mm holes arranged in a staggered manner was placed in front of the positioning device 10 so that these holes were in alignment with the passages 18.

Using the assembly shown in FIG. 2 and the positioning means shown in FIG. 1, nine tubes were threaded at a time in a stepwise manner achieving a rate of 1 feed step per 10 seconds. This rate can, of course, be increased by increasing the tube feed and push rates. The butting ends of one column of tubes (located in the cartridge 34 or the positioning device 20) pushing against an adjacent column of tubes (located in the positioning device 20 or the conduits 36 respectively) did not result in any damage to the ends through the threading process.

It is readily appreciated among those having skill in the art to which the invention pertains, that any number of modifications and variations can be made to the invention described herein. Such modifications and variations are contemplated as within the scope and spirit herein.

In the claims:

1. A device for positioning flexible tubes at predetermined locations therealong comprising:
    a surface comprising:
        a channel formed therein and sufficient to accommodate a plurality of tubes arranged substantially proximally to one another along their lengths thereof;
        a plurality of tapered surfaces interspersed within said channel; and
        a plurality of separately defined passages, wherein said tapered surfaces direct said tubes into said passages therealong,
    wherein said passages define a predetermined pitch of said tubes relative to each other, and wherein the tubes are secured therewithin as the tubes move therethrough.

2. The device of claim 1 wherein said passages of said surface are formed sufficient to contain the tubes therewithin.

3. The device of claim 1 further comprising a second surface contacting said surface so that the tubes are contained by the combination of said surface and said second surface.

4. An apparatus for the insertion of flexible tubes at predetermined locations within a core assembly comprising:
   (a) a receptacle containing a plurality of flexible tubes arranged into one or more columns;
   (b) a ram contacting the tubes within a column and urging the tubes within a positioning device;
   (c) said positioning device comprising a surface comprising a channel formed therein and sufficient to accommodate the tubes arranged substantially proximally to one another along their lengths thereof; and a plurality of tapered surfaces interspersed within said channel to direct said tubes into passages therealong; and
   wherein said passages define a predetermined pitch of said tubes relative to each other; and such that the device secures the tubes as they move therealong;
   (d) a conduit assembly adapted to receive and support the tubes as they are discharged from said passages of said positioning device and into the core assembly; and,
   (e) a plurality of guide rods under operation of a guide mandrel that engage and guide the tubes through the core assembly.

5. The apparatus of claim 4 wherein the core assembly is a heat exchanger.

6. The device of claim 1 further comprising a plurality of surfaces arranged in a predetermined configuration.

7. The apparatus of claim 4 wherein said ram contains staggered surfaces therealong.

* * * * *